US008810050B1

(12) United States Patent
Reiner

(10) Patent No.: US 8,810,050 B1
(45) Date of Patent: Aug. 19, 2014

(54) MAGNET POWERED MOTOR SYSTEM

(71) Applicant: Ben Reiner, Brooklyn, NY (US)

(72) Inventor: Ben Reiner, Brooklyn, NY (US)

(*) Notice: Subject to any disclaimer, the term of this patent is extended or adjusted under 35 U.S.C. 154(b) by 174 days.

(21) Appl. No.: 13/627,550

(22) Filed: Sep. 26, 2012

Related U.S. Application Data

(60) Provisional application No. 61/542,333, filed on Oct. 3, 2011.

(51) Int. Cl.
*H02K 5/00* (2006.01)

(52) U.S. Cl.
USPC .......................................... 290/1 A

(58) Field of Classification Search
USPC ................ 290/1 A; 335/306; 310/156.41
See application file for complete search history.

(56) References Cited

U.S. PATENT DOCUMENTS

| | | | |
|---|---|---|---|
| 5,014,028 A | 5/1991 | Leupold | |
| 5,280,209 A * | 1/1994 | Leupold et al. | 310/156.41 |
| 5,483,116 A | 1/1996 | Kusase et al. | |
| 5,790,006 A | 8/1998 | Abele et al. | |
| 6,252,330 B1 | 6/2001 | Asao et al. | |
| 6,559,553 B2 * | 5/2003 | Yumita et al. | 290/54 |
| 6,768,407 B2 | 7/2004 | Kohda et al. | |
| 7,965,010 B2 | 6/2011 | Froeschle et al. | |
| 8,099,964 B2 * | 1/2012 | Saito et al. | 62/3.1 |

* cited by examiner

*Primary Examiner* — Tho D Ta
(74) *Attorney, Agent, or Firm* — RG Patent Consulting, LLC; Rachel Gilboy

(57) ABSTRACT

A magnet powered motor system is a motor powered by permanent magnets for inexpensively driving motorized apparatuses. The magnet bars have a triangular shaped cross-section and are adjacently mounted as a bar onto an inner and an outer carriage assembly. The inner carriage assembly may be stationary and the outer carriage assembly may rotate within a coil winding assembly having an outer housing which supports the coil, housing end plates, and bearings for the rotating element. The inner carriage assembly is rotationally locked to the cylindrical frame via a key and keyway but slides lengthwise on the cylindrical frame into and out of engagement with the outer carriage assembly to start and stop the motor. The facing inner and outer triangular shaped magnets comprise face angles that optimize magnetic force and have polarity arrangements that pull and simultaneously push the outer carriage assembly into rotation.

19 Claims, 5 Drawing Sheets

MAGNET POWERED MOTOR SYSTEM

CROSS-REFERENCE TO RELATED APPLICATION

The present applications are related to and claims priority from prior provisional application Ser. No. 61/542,333 filed Oct. 3, 2011 which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of motors and more specifically relates to a magnet powered motors.

2. Description of the Related Art

A magnet is a material or object that produces a magnetic field. This magnetic field is invisible but is responsible for the most notable property of a magnet: a force that pulls on other ferromagnetic materials, such as iron, and attracts or repels other magnets. A permanent magnet is an object made from a material that is magnetized and creates its own persistent magnetic field. Permanent magnets are made from "hard" ferromagnetic materials such as alnico and ferrite that are subjected to special processing in a powerful magnetic field during manufacture, to align their internal microcrystalline structure, making them powerful and very hard to demagnetize.

It has long been desired to create an electricity generator using a magnetic field as its driving force, or the magnetic flux density of the magnets. Every magnet has a positive and a negative pole which can't be seen but the effects of it can be seen as it attracts other ferromagnetic materials or repels the like poles of other magnets. Like poles, (positive to positive or negative to negative) of different magnets repel each other while opposite poles attract. A set of magnets arranged at particular angles to each other in relation to the positive and negative poles of each magnet, may conceivably be use to create such a machine. Many individuals have tried to create an auto-rotating device to produce power. A mass produced highly developed permanent magnet electricity generator would usher in a new era in the modern world and possibly free the world a majority of the need for fossil fuels. Magnets can be made by just about anyone, even a home owner. Power and petroleum products used to drive motors are expensive, thus the status quo is not desirable. It is desirable to have an efficient motor able to run via magnetic power.

Various attempts have been made to solve the above-mentioned problems such as those found in U.S. Pat. Nos. 6,768, 407; 5,014,028; 7,965,010; 5,790,006; 6,252,330; and 5,483, 116. This prior art is representative of magnetic motors. None of the above inventions and patents, taken either singly or in combination, is seen to describe the invention as claimed.

Ideally, a magnet powered motor should provide efficient power, and yet, would operate reliably and be manufactured at a modest expense. Thus, a need exists for a reliable magnet powered motor system to produce electricity and to avoid the above-mentioned problems.

BRIEF SUMMARY OF THE INVENTION

In view of the foregoing disadvantages inherent in the known magnetic motor art, the present invention provides a novel magnet powered motor system. The general purpose of the present invention, which will be described subsequently in greater detail, is to provide decreased utility consumption.

In general terms, the magnet powered motor system is a motor powered by permanent magnets for inexpensively driving motorized apparatuses. The magnet bars have a triangular shaped cross-section and are adjacently mounted into an inner and an outer carriage assembly. The inner carriage assembly may be stationary and the outer carriage assembly may rotate within a coil winding assembly having an outer housing which supports the coil, housing end plates, and bearings for the rotating element. The inner carriage assembly is rotationally locked to the cylindrical frame via a key and keyway but slides lengthwise on the cylindrical frame into and out of engagement with the outer carriage assembly to start and stop the motor. The facing inner and outer triangular shaped magnets comprise face angles that optimize magnetic force, removing the guesswork for having to adjust and readjust magnet angles, having polarity arrangements that pull and simultaneously push the outer carriage assembly into rotation and help keep it in motion.

A magnet powered motor system, as disclosed herein, in a preferred embodiment may comprise: a magnetic motor assembly having an outer housing with an inner coil, an outer carriage assembly having a plurality of outer triangular permanent magnets, an inner carriage assembly having a cylindrical frame, and a plurality of inner triangular permanent magnets. The inner coil is at least one electrical winding evenly distributed and wound about an inner circumference of the outer housing to create at least one electrical circuit. The outer carriage assembly is concentrically spaced and located within an inner periphery of the inner coil. The outer periphery of the outer carriage assembly is spaced such that the outer carriage assembly is able to rotate within the inner coil. The plurality of outer triangular permanent magnets are removably affixed to the inner circumference of the outer carriage assembly so that the outer triangular permanent magnets are adjacently and evenly spaced in relation to each other about the inner circumference.

The cylindrical frame of the inner carriage assembly is concentrically located within the inner carriage assembly and may be in a stationary relationship with the inner coil and the outer housing. The plurality of inner triangular permanent magnets are mounted about the outer-periphery-surface of the inner carriage assembly such that the inner triangular permanent magnets are adjacently and evenly spaced in relation to each other having a uniform spacing that is constantly maintained between the plurality of inner triangular permanent magnets and the plurality of outer triangular permanent magnets while rotating.

The plurality of inner triangular permanent magnets comprise a negative pole located adjacent the inner carriage assembly at each base and a first positive pole located on a first face and a second positive pole located on a second face, both the first face and the second face approaching an apex (end tip). The plurality of outer triangular permanent magnets comprise a first negatively-charged-pole located adjacent the outer carriage assembly and a positively-charged-pole located on a left face and a second negatively-charged-pole located on a right face, both the left face and the right face approaching a pinnacle (end tip).

The plurality of first positive poles of the inner triangular permanent magnets are oriented parallel to the plurality of second negatively-charged-poles of the outer triangular permanent magnets and the plurality of second positive poles of the inner triangular permanent magnets are also disposed parallel to the plurality of positively-charged-poles of the outer triangular permanent magnets. This orientation is desirable such that a repelling force is caused by adjacent polarities which are alike between the left face(s) and the second face(s), the inner triangular permanent magnets and the outer triangular permanent magnets thereby causes a pushing action on one another. The polarities of the inner triangular permanent magnets and the outer triangular permanent magnets as related between the right face(s) and the first face(s) are such that the polarity is unlike causing an attracting force. The repelling force is followed by the attracting force in conjunction causing useful rotation for providing power with increased efficiency.

The left faces and the right faces of the plurality of outer triangular permanent magnets and the first faces and the second faces of the plurality of inner triangle permanent magnets each further have face angles such that during the rotation of the outer carriage assembly, the face angles of the outer triangular permanent magnets become momentarily adjacently parallel to the inner triangular permanent magnets. During the rotation of the outer carriage assembly, as the face angles of the outer triangular permanent magnets and the face angles of the plurality of inner triangular permanent magnets become adjacently parallel, wherein the repelling force is at the strongest condition. The plurality of outer triangular permanent magnets and the plurality of inner triangular permanent magnets each further comprise a bar having three longitudinal faces and two end faces. The outer triangular permanent magnets and the inner triangular permanent magnets are not interchangeable with each other and the outer magnets are greater in number than the inner so as to achieve proper desired positioning relative to each other.

The inner carriage assembly is able to slide longitudinally along the cylindrical frame such that the plurality of inner triangular permanent magnets are brought into a close adjacent relationship (to engage) and inversely out of the close adjacent relationship to the plurality of outer triangular permanent magnets (to disengage). The magnetic motor assembly is able to provide a rotational motion useable to power an electricity generator when the inner carriage assembly and the outer carriage assembly are in an engaged condition. When the plurality of inner triangular permanent magnets is slidably placed into a close adjacent relationship to the outer triangular permanent magnets, the magnetic motor assembly is thereby placed in an operating condition. When the plurality of inner triangular permanent magnets is slidably removed from the close adjacent relationship to the outer triangular permanent magnets, the magnetic motor assembly is thereby placed in a non-operating condition. In this way operation and non-operation can be controlled by an operator.

The inner carriage assembly preferably comprises a key and a keyway such that the inner carriage assembly is rotationally locked to the inner cylinder; the inner cylinder is thereby in a stationary relationship with the outer housing. The outer carriage assembly is able to rotate and the inner carriage assembly is stationary with the outer housing and coil in preferred embodiments. The inner carriage assembly is cylindrical and carried by at least one bearing. The outer carriage assembly is cylindrical and comprises a drum (shape) also carried by bearing(s). The cylindrical frame may comprise a shaft. The outer carriage assembly is rotationally supported via the bearing mounted to the cylindrical frame of the inner carriage assembly.

A method of use for the magnet powered motor system may include slideably engaging the plurality of outer triangular permanent magnets with the plurality of inner triangular permanent magnets to start the magnetic motor assembly, and slideably disengaging the plurality of outer triangular permanent magnets with the plurality of inner triangular permanent magnets to stop the magnetic motor assembly.

The present invention holds significant improvements and serves as a magnet powered motor system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention; magnet powered motor system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a motor device and more particularly to a magnet powered motor system as used to power rotating equipment and lower the cost of utility inputs.

Figure 1:
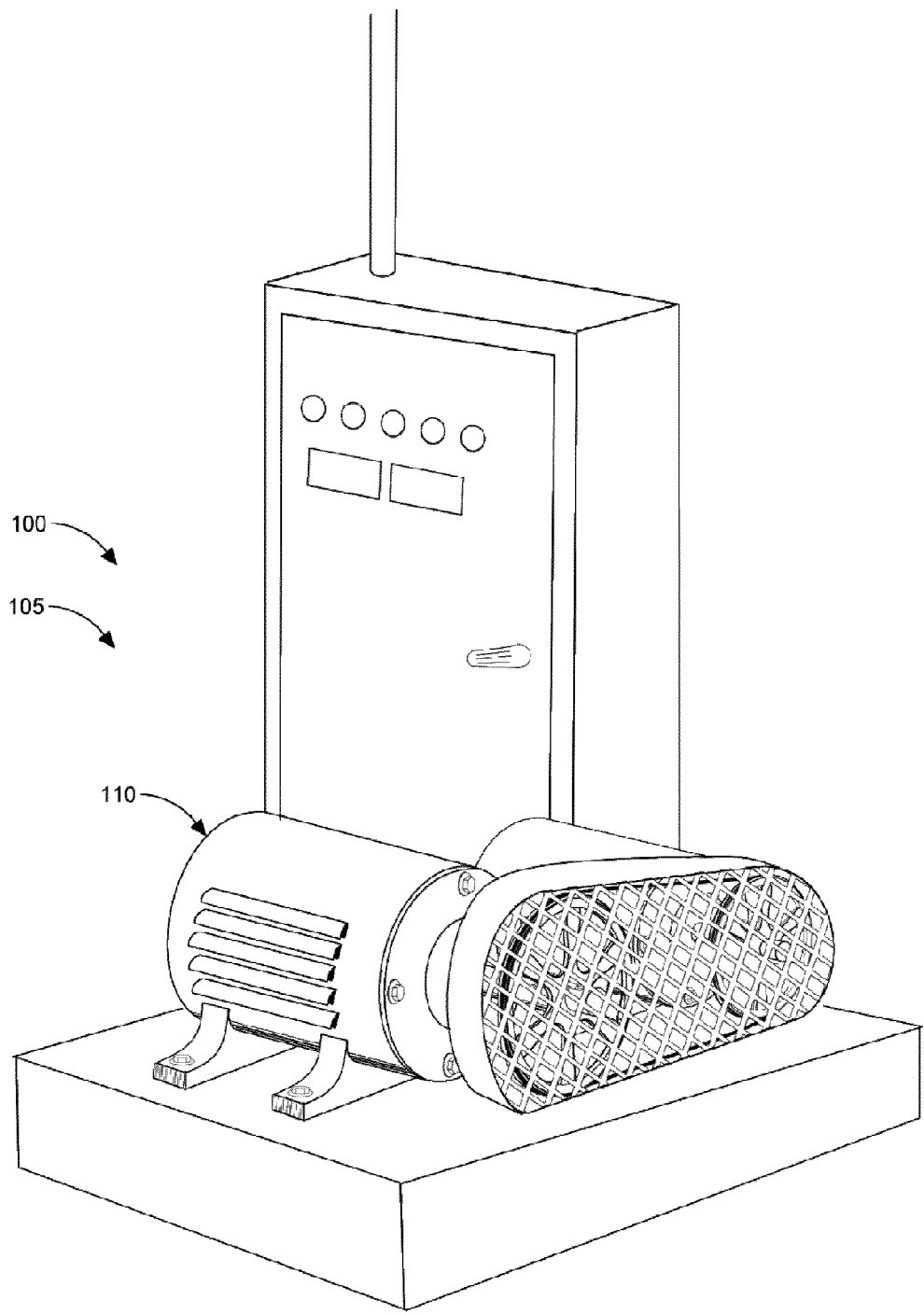
FIG. 1 shows a perspective view illustrating an in use condition of a magnet powered motor system according to an embodiment of the present invention.

In greater detail now, referring to the drawings by numerals of reference, there is shown in FIG. 1, a perspective view illustrating an in use condition of magnet powered motor system 100 according to an embodiment of the present invention.

Magnet powered motor system 100 may comprise magnetic motor assembly 105 comprising outer housing 110 having inner coil 115, outer carriage assembly 120 having a plurality of outer triangular permanent magnets 170, inner carriage assembly 130 having cylindrical frame 135, and a plurality of inner triangular permanent magnets 140. Inner coil 115 comprises at least one electrical winding evenly distributed and wound about inner circumference 112 of outer housing 110 to create at least one electrical circuit.

Outer carriage assembly 120 is concentrically spaced and located within inner periphery 117 of inner coil 115, and outer periphery 122 of outer carriage assembly 120 is spaced such that outer carriage assembly 120 is able to rotate within inner coil 115. The plurality of outer triangular permanent magnets 170 are removably affixed to inner circumference of carriage assembly such that outer triangular permanent magnets 170 are adjacently and evenly spaced in relation to each other about inner circumference 112. Cylindrical frame 135 of inner carriage assembly 130 is concentrically mounted within inner carriage assembly 130 such that cylindrical frame 135 is in a stationary relationship with inner coil 115 and outer housing 110 as shown in the subsequent figures.

Figure 2:
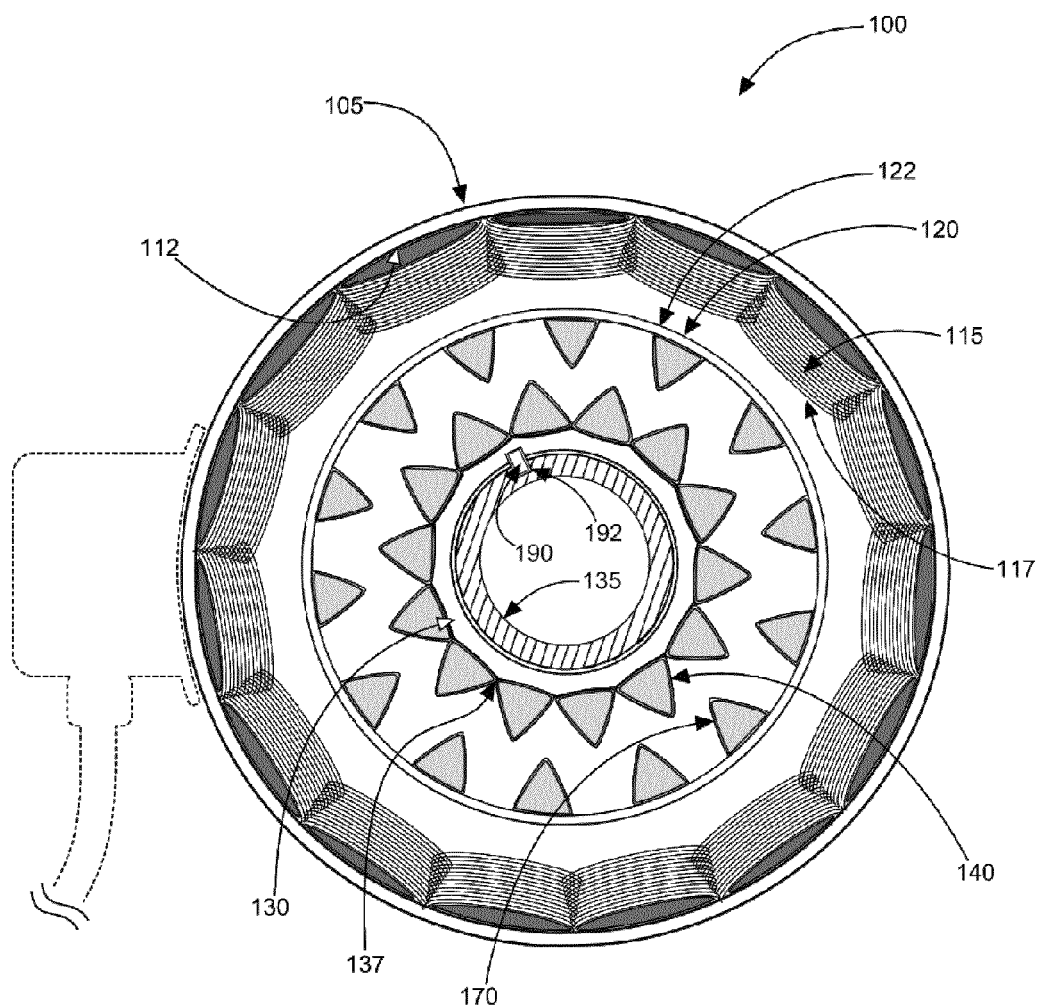
FIG. 2 is a perspective view illustrating an end view of the magnet powered motor system according to an embodiment of the present invention of FIG. 1.
Figure 4:
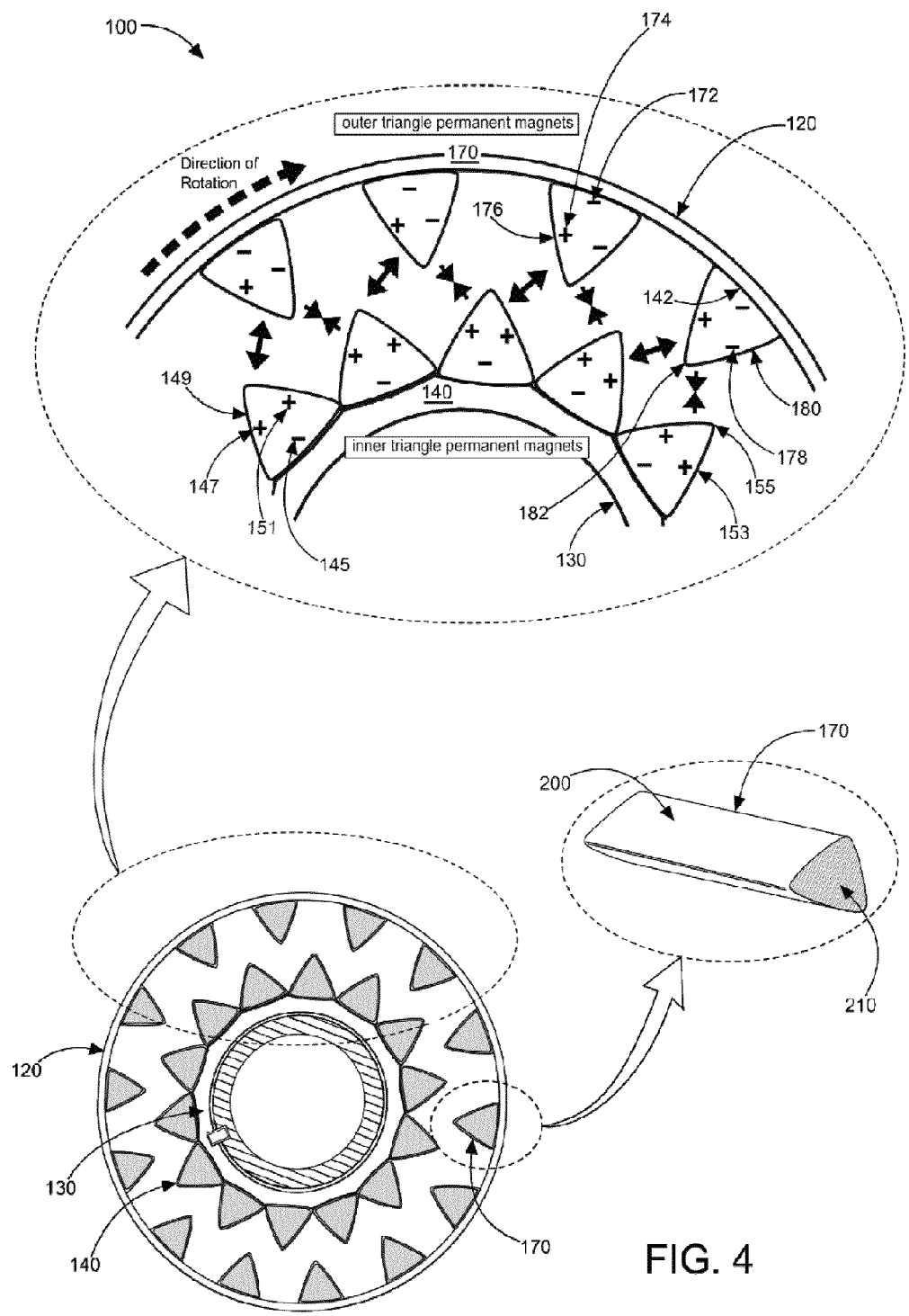
FIG. 4 is a perspective view illustrating magnet arrangement and magnet polarity arrangements of the magnet powered motor system according to an embodiment of the present invention of FIG. 1.

The plurality of inner triangular permanent magnets 140 are mounted about outer-periphery-surface 137 of inner carriage assembly 130 such that inner triangular permanent magnets 140 are adjacently and evenly spaced in relation to each other having a uniform spacing that is constantly maintained between the plurality of inner triangular permanent magnets 140 and the plurality of outer triangular permanent magnets 170 while rotating (as shown in FIG. 2). The plurality of inner triangular permanent magnets 140 comprise negative poles 145 located adjacent inner carriage assembly 130 at base 142 and first positive pole 147 located on first face 149 and second positive pole 151 located on second face 153, both first face 149 and second face 153 approaching an apex 155. Apex 155 is located perpendicular to base 142, base 142 mounted flat against inner carriage assembly 130 in preferred embodiments, as shown in FIGS. 2 and 4.

The plurality of outer triangular permanent magnets 170 comprise first negatively-charged-poles 172 (shown in FIG. 4) located adjacent outer carriage assembly 120 and positively-charged-pole 174 located on left face 176 and second negatively-charged-pole 178 located on right face 180; both left face 176 and right face 180 approaching pinnacle 182. The plurality of first positive pole(s) 147 of inner triangular permanent magnets 140 are oriented parallel to the plurality of second negatively-charged-pole(s) 178 of outer triangular permanent magnets 170 and the plurality of second positive pole(s) 151 of inner triangular permanent magnets 140 are also disposed parallel to the plurality of positively-charged-poles 174 of outer triangular permanent magnets 170 such that a repelling force is caused by adjacent polarities which are alike between left face(s) 176 and second face(s) 153. In this way inner triangular permanent magnets 140 and outer triangular permanent magnets 170 thereby are able to cause a pushing action on one another. The polarities of inner triangular permanent magnets 140 and outer triangular permanent magnets 170 as related between right face(s) 180 and first face(s) 149 are such that the polarities are unlike, causing an attracting force and a repelling force that is followed by an attracting force in conjunction causing useful rotation for providing power with increased efficiency.

Referring now to FIG. 2, a perspective view illustrating an end view of (looking internally into) magnet powered motor system 100 according to an embodiment of the present invention of FIG. 1.

Left face(s) 176 and right face(s) 180 of the plurality of outer triangular permanent magnets 170, first face(s) 149, and second face(s) 153 of the plurality of inner triangular permanent magnets 140 each further comprise face angles such that during rotation of outer carriage assembly 120, the face angles of outer triangular permanent magnets 170 become momentarily adjacently parallel to inner triangular permanent magnets 140. Inner carriage assembly 130 may comprise key 190 and keyway 192 (shown in FIG. 3) such that inner carriage assembly 130 is rotationally locked to cylindrical frame 135, cylindrical frame 135 (which is preferably a shaft) thereby in a stationary relationship with outer housing 110. Inner carriage assembly 130 inversely may be able to rotate and outer carriage assembly 120 may be stationary with outer housing 110 in certain embodiments. Outer carriage assembly 120 is able to rotate and inner carriage assembly 130 is stationary with outer housing 110 in a preferred embodiment. Outer carriage assembly 120 may be cylindrical and comprise a drum (shape) carried by at least one bearing 199, also alluded to in FIG. 3.

Figure 3:
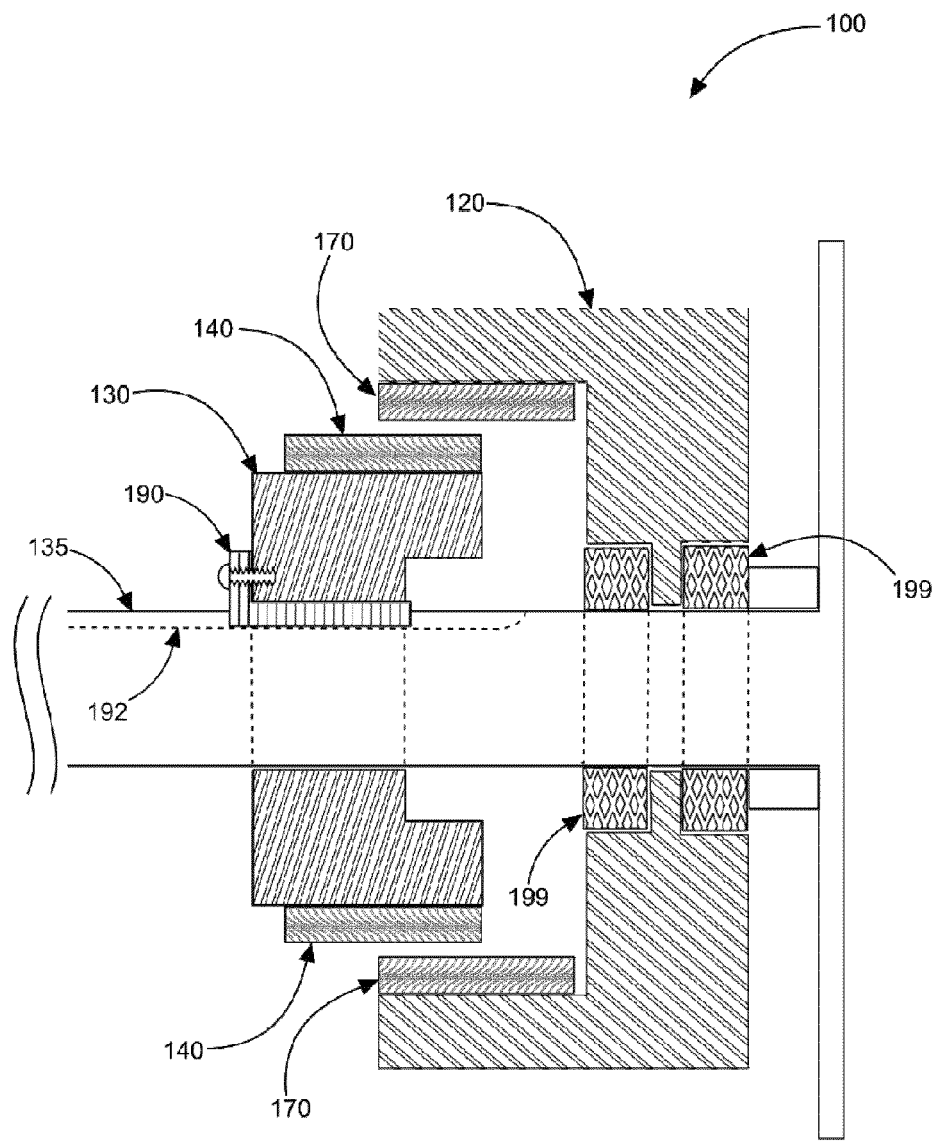
FIG. 3 is a perspective view illustrating a cutaway view of the magnet powered motor system according to an embodiment of the present invention of FIG. 1.

Referring now to FIG. 3, a perspective view illustrating a cutaway view of magnet powered motor system 100 according to an embodiment of the present invention of FIG. 1.

The plurality of outer triangular permanent magnets 170 and the plurality of inner triangular permanent magnets 140 each further comprise a (pyramidal shaped) bar (shown in FIG. 4) having three longitudinal faces 200 and two end faces 210. Magnetic motor assembly 105 is able to provide a rotational motion that is able to be used to power an electricity generator when inner carriage assembly 130 and outer carriage assembly 120 is in an engaged condition. Inner carriage assembly 130 is able to slide longitudinally along cylindrical frame 135 such that the plurality of inner triangular permanent magnets 140 are brought into a close adjacent relationship and inversely out of a close adjacent relationship to the plurality of outer triangular permanent magnets 170. The plurality of inner triangular permanent magnets 140 is slidably placed into a close adjacent relationship to outer triangular permanent magnets 170; magnetic motor assembly 105 is thereby placed in an operating condition.

The plurality of inner triangular permanent magnets 140 is slideably removable from a close adjacent relationship to outer triangular permanent magnets 170; magnetic motor assembly 105 is thereby placed in a non-operating condition. Inner carriage assembly 130 may comprise key 190 and keyway 192 such that inner carriage assembly 130 is rotationally locked to cylindrical frame 135; cylindrical frame 135 thereby is in a stationary relationship with outer housing 110. Inner carriage assembly 130 may comprise an armature in some embodiments that is rotationally powered via a magnetic repulsion force able to generate electricity when inner carriage assembly 130 and outer carriage assembly 120 is in an engaged condition. Cylindrical frame 135 may comprise a solid shaft in some embodiments. Outer carriage assembly 120 is rotationally supported via bearing 199 mounted to cylindrical frame 135 of inner carriage assembly 130.

Referring now to FIG. 4, a perspective view illustrating the preferred magnet arrangement and magnet polarity arrangements of magnet powered motor system 100 according to an embodiment of the present invention of FIG. 1.

Left face(s) 176 and right face(s) 180 of the plurality of outer triangular permanent magnets 170 and first face(s) 149 and second face(s) 153 of the plurality of inner triangular permanent magnets 140 each comprise face angles such that during a rotation of outer carriage assembly 120, the face angles of outer triangular permanent magnets 170 become momentarily adjacently parallel to inner triangular permanent magnets 140. During rotation of outer carriage assembly 120, as the face angles of outer triangular permanent magnets 170 and the face angles of the plurality of inner triangular permanent magnets 140 become adjacently parallel, the repelling force is at the strongest condition. Outer triangular permanent magnets 170 and inner triangular permanent magnets 140 are not interchangeable with each other, as previously mentioned. Apex 155 is located perpendicular to base 142, base 142 mounted flat against inner carriage assembly 130. The present invention may comprise a powering means or a power assisting means (kinetic energy from external sources may be added in to start or maintain operation).

Figure 5:
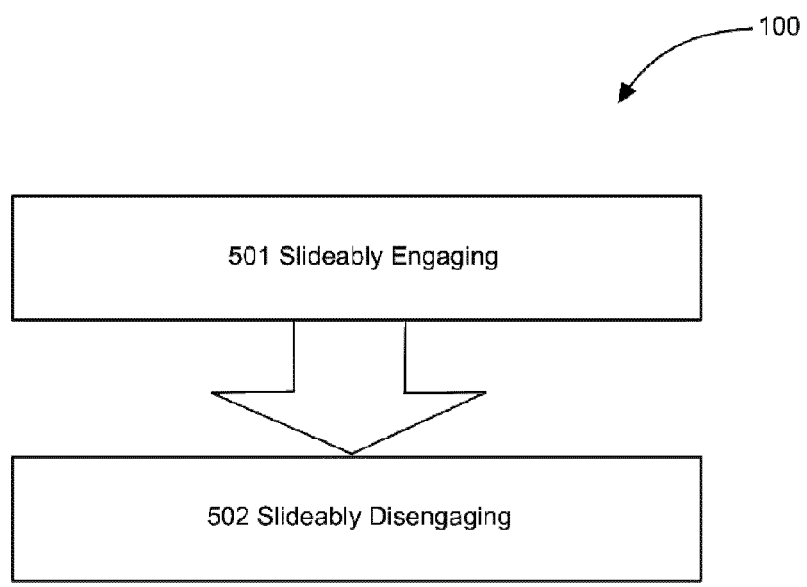
FIG. 5 is a flowchart illustrating a method of use of the magnet powered motor system according to an embodiment of the present invention of FIGS. 1-4.

Referring now to FIG. 5, showing a flowchart illustrating method of use 500 for magnet powered motor system 100 according to an embodiment of the present invention of FIGS. 1-4. A method of use for magnet powered motor system 100 may comprise the steps of: step one 501, slideably engaging the plurality of outer triangular permanent magnets 170 with the plurality of inner triangular permanent magnets 140 to start magnetic motor assembly 105; and step two 502, slideably disengaging the plurality of outer triangular permanent magnets 170 with the plurality of inner triangular permanent magnets 140 to stop magnetic motor assembly 105.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A magnet powered motor system comprising:
a magnetic motor assembly having:
an outer housing having an inner coil;
an outer carriage assembly having:
a plurality of outer triangular permanent magnets;
an inner carriage assembly having:
a cylindrical frame; and
a plurality of inner triangular permanent magnets; and
wherein said inner coil is at least one electrical winding evenly distributed and wound about an inner circumference of said outer housing to create at least one electrical circuit;
wherein said outer carriage assembly is concentrically spaced and located within an inner periphery of said inner coil, an outer periphery of said outer carriage assembly is spaced such that said outer carriage assembly is able to rotate within said inner coil;
wherein said plurality of said outer triangular permanent magnets are removably affixed to an inner circumference of said outer carriage assembly such that said outer triangular permanent magnets are adjacently and evenly spaced in relation to each other about of said carriage assembly;
wherein said cylindrical frame of said inner carriage assembly is concentrically mounted within said inner carriage assembly such that said cylindrical frame is in a stationary relationship with said inner coil and said outer housing;
wherein said plurality of inner triangular permanent magnets are mounted about an outer-periphery-surface of said inner carriage assembly such that said inner triangular permanent magnets are adjacently and evenly spaced in relation to each other such that a uniform spacing is constantly maintained between said plurality of inner triangular permanent magnets and said plurality of outer triangular permanent magnets while rotating;
wherein said plurality of inner triangular permanent magnets comprise a negative pole located adjacent said inner carriage assembly at a base and a first positive pole located on a first face and a second positive pole located on a second face, both of said first face and said second face approaching an apex;
wherein said apex is located perpendicular to said base, said base mounted flat on said inner carriage assembly;
wherein said plurality of outer triangular permanent magnets comprise a first negatively-charged-pole located adjacent said outer carriage assembly and a positively-charged-pole located on a left face and a second negatively-charged-pole located on a right face, both of said left face and said right face approaching a pinnacle;
wherein said plurality of first positive poles of said inner triangular permanent magnets are oriented parallel to said plurality of second negatively-charged-poles of said outer triangular permanent magnets and said plurality of second positive poles of said inner triangular permanent magnets are also disposed parallel to said plurality of positively-charged-poles of said outer triangular permanent magnets such that a repelling force is caused by adjacent polarities which are alike between said left face(s) and said second face(s), said inner triangular permanent magnets and said outer triangular permanent magnets thereby causes a pushing action on one another;
wherein said polarities of said inner triangular permanent magnets and said outer triangular permanent magnets as related between said right face(s) and said first face(s) are such that said polarity is unlike causing an attracting force; and
wherein said repelling force is followed by said attracting force in conjunction causing useful rotation for providing power with increased efficiency.

2. The magnet powered motor system of claim 1 wherein said inner carriage assembly is able to rotate and said outer carriage assembly is stationary with said outer housing.

3. The magnet powered motor system of claim 1 wherein said outer carriage assembly is able to rotate and said inner carriage assembly is stationary with said outer housing.

4. The magnet powered motor system of claim 1 wherein said inner carriage assembly is cylindrical and carried by at least one bearing.

5. The magnet powered motor system of claim 1 wherein said cylindrical frame comprises a shaft.

6. The magnet powered motor system of claim 1 wherein said left faces and said right faces of said plurality of outer triangular permanent magnets and said first faces and said second faces of said plurality of inner triangle permanent magnets each further comprise face angles such that during said rotation of said outer carriage assembly, said face angles of said outer triangular permanent magnets become momentarily adjacently parallel to said inner triangular permanent magnets.

7. The magnet powered motor system of claim 6 wherein during said rotation of said outer carriage assembly, as said face angles of said outer triangular permanent magnets and said face angles of said plurality of inner triangular permanent magnets become adjacently parallel, said repelling force is at a strongest condition.

8. The magnet powered motor system of claim 6 wherein said plurality of outer triangular permanent magnets and said plurality of inner triangular permanent magnets each further comprise a bar comprising three longitudinal faces and two end faces.

9. The magnet powered motor system of claim 8 wherein said outer triangular permanent magnets and said inner triangular permanent magnets are not interchangeable with each other.

10. The magnet powered motor system of claim 9 wherein said apex is located perpendicular to said base, said base mounted flat on said inner carriage assembly.

11. The magnet powered motor system of claim 1 wherein said inner carriage assembly is able to slide longitudinally along said cylindrical frame such that said plurality of inner triangular permanent magnets are brought into a close adjacent relationship and inversely out of said close adjacent relationship to said plurality of outer triangular permanent magnets.

12. The magnet powered motor system of claim 11 wherein said plurality of inner triangular permanent magnets is slidably placed into said close adjacent relationship to said outer triangular permanent magnets, said magnetic motor assembly is thereby placed in an operating condition.

13. The magnet powered motor system of claim 12 wherein said plurality of inner triangular permanent magnets is slideably removed from said close adjacent relationship to said outer triangular permanent magnets, said magnetic motor assembly is thereby placed in a non-operating condition.

14. The magnet powered motor system of claim 13 wherein said inner carriage assembly comprises a key and a keyway such that said inner carriage assembly is rotationally locked to said inner cylinder, said inner cylinder thereby in a stationary relationship with said outer housing.

15. The magnet powered motor system of claim 1 wherein said magnetic motor assembly is able to provide a rotational motion able to be used to power an electricity generator when said inner carriage assembly and said outer carriage assembly is in an engaged condition.

16. The magnet powered motor system of claim 15 wherein said inner carriage assembly comprises an armature and is able to rotate via a magnetic repulsion force to generate electricity when said inner carriage assembly and said outer carriage assembly is in said engaged condition.

17. The magnet powered motor system of claim 1 wherein said outer carriage assembly is cylindrical and comprises a drum carried by at least one bearing.

18. The magnet powered motor system of claim 17 wherein said outer carriage assembly is rotationally supported via said bearing mounted to said cylindrical frame of said inner carriage assembly.

19. A magnet powered motor system comprising:
a magnetic motor assembly having:
an outer housing having an inner coil;
an outer carriage assembly having:
a plurality of outer triangular permanent magnets;
an inner carriage assembly having:
a cylindrical frame; and
a plurality of inner triangular permanent magnets; and
wherein said inner coil is at least one electrical winding evenly distributed and wound about an inner circumference of said outer housing to create at least one electrical circuit;
wherein said outer carriage assembly is concentrically spaced and located within an inner periphery of said inner coil, an outer periphery of said outer carriage assembly is spaced such that said outer carriage assembly is able to rotate within said inner coil;
wherein said plurality of said outer triangular permanent magnets are removably affixed to an inner circumference of said carriage assembly such that said outer triangular permanent magnets are adjacently and evenly spaced in relation to each other about said inner circumference of said outer carriage assembly;
wherein said cylindrical frame of said inner carriage assembly is concentrically mounted within said inner carriage assembly such that said cylindrical frame is in a stationary relationship with said inner coil and said outer housing;
wherein said plurality of inner triangular permanent magnets are mounted about an outer-periphery-surface of said inner carriage assembly such that said inner triangular permanent magnets are adjacently and evenly spaced in relation to each other such that a uniform spacing is constantly maintained between said plurality of inner triangular permanent magnets and said plurality of outer triangular permanent magnets while rotating;
wherein said plurality of inner triangular permanent magnets comprise a negative pole located adjacent said inner carriage assembly at a base and a first positive pole located on a first face and a second positive pole located on a second face, both of said first face and said second face approaching an apex;
wherein said plurality of outer triangular permanent magnets comprise a first negatively-charged-pole located adjacent said outer carriage assembly and a positively-charged-pole located on a left face and a second negatively-charged-pole located on a right face, both of said left face and said right face approaching a pinnacle;
wherein said plurality of first positive poles of said inner triangular permanent magnets are oriented parallel to said plurality of second negatively-charged-poles of said outer triangular permanent magnets and said plurality of second positive poles of said inner triangular permanent magnets are also disposed parallel to said plurality of positively-charged-poles of said outer triangular permanent magnets such that a repelling force is caused by adjacent polarities which are alike between said left face(s) and said second face(s), said inner triangular permanent magnets and said outer triangular permanent magnets thereby causes a pushing action on one another;
wherein said polarities of said inner triangular permanent magnets and said outer triangular permanent magnets as related between said right face(s) and said first face(s) are such that said polarity is unlike causing an attracting force;
wherein said repelling force is followed by said attracting force in conjunction causing useful rotation for providing power with increased efficiency;

wherein said left faces and said right faces of said plurality of outer triangular permanent magnets and said first faces and said second faces of said plurality of inner triangle permanent magnets each further comprise face angles such that during said rotation of said outer carriage assembly, said face angles of said outer triangular permanent magnets become momentarily adjacently parallel to said inner triangular permanent magnets;

wherein during said rotation of said outer carriage assembly, as said face angles of said outer triangular permanent magnets and said face angles of said plurality of inner triangular permanent magnets become adjacently parallel, said repelling force is at a strongest condition;

wherein said plurality of outer triangular permanent magnets and said plurality of inner triangular permanent magnets each further comprise a pyramidal-shaped bar comprising three longitudinal faces and two end faces;

wherein said outer triangular permanent magnets and said inner triangular permanent magnets are not interchangeable with each other;

wherein said inner carriage assembly is able to slide longitudinally along said cylindrical frame such that said plurality of inner triangular permanent magnets are brought into a close adjacent relationship and inversely out of said close adjacent relationship to said plurality of outer triangular permanent magnets;

wherein said magnetic motor assembly is able to provide a rotational motion able to be used to power an electricity generator when said inner carriage assembly and said outer carriage assembly is in an engaged condition;

wherein said plurality of inner triangular permanent magnets is slidably placed into said close adjacent relationship to said outer triangular permanent magnets, said magnetic motor assembly is thereby placed in an operating condition;

wherein said plurality of inner triangular permanent magnets is slideably removed from said close adjacent relationship to said outer triangular permanent magnets, said magnetic motor assembly is thereby placed in a non-operating condition;

wherein said inner carriage assembly comprises a key and a keyway such that said inner carriage assembly is rotationally locked to said inner cylinder, said inner cylinder thereby in a stationary relationship with said outer housing;

wherein said outer carriage assembly is able to rotate and said inner carriage assembly is stationary with said outer housing;

wherein said inner carriage assembly is cylindrical and carried by at least one bearing;

wherein said outer carriage assembly is cylindrical and comprises a drum carried by at least one bearing;

wherein said cylindrical frame comprises a shaft;

wherein said outer carriage assembly is rotationally supported via said bearing mounted to said cylindrical frame of said inner carriage assembly; and wherein said magnet powered motor system is useful for providing energy producing.

* * * * *